United States Patent [19]

Oliver et al.

[11] Patent Number: 5,225,459
[45] Date of Patent: Jul. 6, 1993

[54] METHOD OF MAKING AN IRON/POLYMER POWDER COMPOSITION

[75] Inventors: Christopher Oliver, Marlton; Shelton Clisby, Maple Shade, both of N.J.

[73] Assignee: Hoeganaes Corporation, Riverton, N.J.

[21] Appl. No.: 830,137

[22] Filed: Jan. 31, 1992

[51] Int. Cl.$^5$ .............................................. C08K 3/08
[52] U.S. Cl. ..................................... 523/220; 523/223
[58] Field of Search ............................. 523/220, 223

[56] References Cited

U.S. PATENT DOCUMENTS

| | | | |
|---|---|---|---|
| 3,766,095 | 10/1973 | Mastrangelo | 523/220 |
| 3,766,096 | 10/1973 | Mastrangelo | 252/513 |
| 3,935,340 | 1/1976 | Yamaguchi et al. | 427/216 |
| 4,106,932 | 8/1978 | Blanchford | 75/252 |
| 4,543,382 | 9/1985 | Tsuchide et al. | 524/267 |
| 4,601,765 | 7/1986 | Soileau et al. | 148/104 |
| 4,927,473 | 5/1990 | Ochiai et al. | 148/306 |
| 4,947,065 | 8/1990 | Ward et al. | 310/44 |
| 5,063,011 | 11/1991 | Rutz et al. | 264/126 |

*Primary Examiner*—Paul R. Michl
*Assistant Examiner*—Olga Asinovsky
*Attorney, Agent, or Firm*—Woodcock Washburn Kurtz Mackiewicz & Norris

[57] ABSTRACT

A powder composition of iron-based powder particles to which is bonded a polymeric material is prepared by making a dry admixture of the iron-based particles and particles of the polymer, wetting the admixture with a solvent for the polymeric material, and removing the solvent to leave a flowable powder composition. The powder compositions can be compression molded, generally at a temperature above the glass transition temperature of the polymer, to form magnetic core components.

13 Claims, No Drawings

METHOD OF MAKING AN IRON/POLYMER POWDER COMPOSITION

FIELD OF THE INVENTION

This invention relates to a method of making a powder composition comprising iron-based powder particles to which is bonded polymeric material, generally in particulate form. More specifically, the method of the invention is directed to the use of a solvent for the polymeric material to effect bonding of the polymer to the iron particles after the iron and polymer are first admixed in dry form. The powder compositions so made are particularly useful to make magnetic core components.

BACKGROUND OF THE INVENTION

Iron-based particles have long been used as a base material in the manufacture of structural components by powder metallurgical methods. The iron-based particles are first molded in a die under high pressures in order to produce the desired shape. After the molding step, the structural component usually undergoes a sintering step to impart the necessary strength to the component.

Magnetic core components have also been manufactured by such power metallurgical methods, but the iron-based particles used in these methods are generally coated with a circumferential layer of insulating material.

Two important characteristics of an iron core component are its magnetic permeability and core loss characteristics. The magnetic permeability of a material is an indication of its ability to become magnetized, or its ability to carry a magnetic flux. Permeability is defined as the ratio of the induced magnetic flux to the magnetizing force or field intensity. When a magnetic material is exposed to a rapidly varying field, the total energy of the core is reduced by the occurrence of hysteresis losses and/or eddy current losses. The hysteresis loss is brought about by the necessary expenditure of energy to overcome the retained magnetic forces within the iron core component. The eddy current loss is brought about by the production of electric currents in the iron core component due to the changing flux caused by alternating current conditions.

Early magnetic core components were made from laminated sheet steel, but these components were difficult to manufacture and experienced large core losses at higher frequencies. Application of these lamination-based cores is also limited by the necessity to carry magnetic flux only in the plane of the sheet in order to avoid excessive eddy current losses. Sintered metal powders have been used to replace the laminated steel as the material for the magnetic core component, but these sintered parts also have high core losses and are restricted primarily to direct current operations.

Research in the powder metallurgical manufacture of magnetic core components using coated iron-based powders has been directed to the development of iron powder compositions that enhance certain physical and magnetic properties without detrimentally affecting other properties. Desired properties include a high permeability through an extended frequency range, high pressed strength, low core losses, and suitability for compression molding techniques.

When molding a core component for AC power applications, it is generally required that the iron particles have an electrically insulating coating to decrease core losses. The use of a plastic coating over the iron particles (see U.S. Pat. No. 3,935,340 to Yamaguchi) and the use of doubly-coated iron particles (see U.S. Pat. No. 4,601,765 to Soileau et al.) have been employed to insulate the iron particles and therefore reduce eddy current losses.

Recently, it has been found that the insulating polymeric material need not be present in the powder composition as a full coating of the individual iron particles, but rather can be present in the form of discrete particles that are integrally admixed with the iron particles. The present invention is directed to a method of forming this admixture in a manner that ensures homogeneity and thereby leads to improved magnetic properties of pressed parts made with the powder composition. The invention eliminates the need to provide the iron-based particles with a circumferential coating of the polymeric material, which coating generally required the use of more expensive fluidized bed processes.

SUMMARY OF THE INVENTION

The present invention provides a method of making an iron/polymer powder composition that comprises iron-based powder particles and a polymeric material that is bonded to the iron-based particles. According to the method, a dry admixture of the iron-based particles and particles of the polymer is made. Generally, the polymeric material will constitute about 0.001-15.0% by weight of the combined weights of the iron-based particles and polymer. The dry admixture is then wetted with a solvent for the polymeric material. Preferably, the solvent is sprayed onto the admixture while the admixture is being further mixed. Thereafter, the solvent is removed, leaving a flowable powder composition of the iron-based particles to which is bonded the polymeric material.

The method is applicable to forming a powder composition from any iron-based particles and polymeric material. By "iron-based" is meant any of the iron-containing particles generally used in powder metallurgical methods including, but not limited to, particles of substantially pure iron, and particles of iron that has been pre-alloyed with, for example, transition metals and/or other fortifying elements. Although the method is applicable to use of any polymeric material, it has its most significant utility with respect to the use of thermoplastic materials that are good insulators for magnetic core components. Preferred thermoplastic materials are biphenylene ethers and polyether imides, and the preferred solvent for use with these polymers is methylene chloride.

DETAILED DESCRIPTION OF THE INVENTION

According to the present invention, it has been found that polymeric insulating materials can be glued or bonded to iron-based powders to provide a composition that has substantial homogeneity and that will provide, upon compaction, magnetic core components having excellent magnetic properties. According to the present invention, the iron-based particles and particles of the polymer material are first admixed, generally in a dry state, to form a substantially homogeneous admixture of the two. The dry admixture is then contacted by a relatively small amount of a solvent for the polymer in a manner, as more fully described below, that ensures substantial wetting of the entire admixture. Thereafter, the solvent is removed, providing a dry, flowable powder composition of iron-based particles to which is bonded the polymeric material. Magnetic core components can then be produced by the powder compositions by known methods.

The iron-based particles that are useful in the invention are any of the pure iron or iron-containing (including steel or ferromagnetic) particles generally used in powder metallurgical methods. Examples are particles of substantially pure iron and particles of iron pre-alloyed with other elements (for example, steel-producing elements) that enhance the strength, hardenability, electromagnetic properties, or other desirable properties of the final product. The particles of iron-based material useful in this invention can have a weight average particle size as small as one micron or below, or up to about 850–1,000 microns, but generally the particles will have a weight average particle size in the range of about 10–500 microns. Preferred are particle compositions having a maximum average particles size of about 350 microns, and more preferred are particle compositions having a maximum average particle size of about 250 microns.

The preferred iron-based particles for use in the invention are highly compressible powders of substantially pure iron; that is, iron containing not more than about 1.0% by weight, preferably no more than about 0.5% by weight, of normal impurities. Examples of such metallurgical grade pure iron powders are the ANCORSTEEL 1000 series of iron powders available from Hoeganaes Corporation, Riverton, N.J. A particularly preferred such powder is ANCORSTEEL 1000C iron powder, which has a typical screen profile of about 13% by weight of the particles below a No. 325 sieve and about 17% by weight of the particles larger than a No. 100 sieve with the remainder between these two sizes (trace amounts larger than No. 60 sieve). The ANCORSTEEL 1000C powder has an apparent density of from about 2.8 to about 3.0 g/cm$^2$.

Other iron-based powders that are useful in the practice of the invention are ferromagnetic or steel powders containing effective amounts of alloying elements pre-alloyed with the iron. Examples of good ferromagnetic materials are particles of iron pre-alloyed with small amounts of phosphorus. Other good ferromagnetic materials are blends of ferrophosphorus powders, such as iron-phosphorus alloys or iron phosphide compounds in powdered form, admixed with particles of substantially pure iron. Such powder mixtures are disclosed in U.S. Pat. No. 3,836,355 issued September 1974 to Tengzelius et al. and U.S. Pat. No. 4,093,449 1978 to Svensson et al. Examples of steel powders are particles of iron pre-alloyed with one or more transition elements or other fortifying elements, such as molybdenum, nickel, manganese, copper, and chromium. Various pre-alloyed steel powders that can be used in the practice of this invention are available from Hoeganaes Corp. as part of its ANCORSTEEL line of steel powders.

The iron-based particles can first be coated with an insulative inorganic material to provide an inner coating that underlies the bonded polymeric material. This inner coating is preferably no greater than about 0.2% by total weight of the coated particle. Such inner coatings include iron phosphate, such as disclosed in U.S. Pat. No.5,063,011 issued November 1991 to Rutz et al, and alkaline metal silicates, such as disclosed in U.S. Pat. No.4,601,765 issued July 1986 to Soileau et al. The disclosures of these patents are hereby incorporated by reference.

Any polymeric material that can be sufficiently softened and/or dissolved by a solvent so as to be able to adhere or bond to the surfaces of the iron-based particles can be used in this invention. Preferred polymeric materials are thermoplastic materials, particularly those that have a weight average molecular weight in the range of about 10,000 to 50,000. More preferred are thermoplastic polymers of such a molecular weight range that have a glass transition temperature in the range of about 175°–450° F. (about 80°–230° C.). Examples of the thermoplastic material are polyetherimides, polyphenylene ethers, polyethersulfones, polycarbonates, polyethylene glycol, polyvinyl acetate, and polyvinyl alcohol.

Suitable polycarbonates that can be utilized as a thermoplastic in the present invention are bisphenol-A-polycarbonates, also known as poly(bisphenol-A-carbonate). These polycarbonates have a specific gravity range of about 1.2 to 1.6. A specific example is poly(oxycarbonyloxy-1,4-phenylene-(1-methylethlidene)-1,4-phenylene) having an empirical formula of $(C_{16}H_{14}O_3)_n$ where n is an integer of about 30–60. Commercially available polycarbonates are the LEXAN resins from General Electric Company. The most preferred LEXAN resins are the LEXAN 121 and 141 grades.

A suitable polyphenylene ether thermoplastic is poly(2,6-dimethyl-1,4-phenylene oxide) which has an empirical formula of $(C_8H_8O)_n$ where n is an integer of about 30–100. The polyphenylene ether homopolymer can be admixed with an alloying/blending resin such as a high impact polystyrene, such as poly(butadiene-styrene); and a polyamide, such as Nylon 66 either a s polycaprolactam or poly(hexamethylenediamine-adipate). These thermoplastic materials have a specific gravity in the range of about 1.0 to 1.4. A commercially available polyphenylene is sold as NORYL resin by the General Electric Company. The most preferred NORYL resins are the NORYL 844, 888, and 1222 grades.

A suitable polyetherimide thermoplastic is poly[2,2'-bis(3,4-dicarboxyphenoxy) phenylpropane)-2-phenylene bismide] which has an empirical formula of $(C_{37}H_{24}O_6N_2)_n$ where n is an integer of about 15–27. The polyetherimide thermoplastics have a specific gravity in the range of about 1.2 to 1.6. A commercially available polyetherimide is sold as ULTEM resin by the General Electric Company. The most preferred ULTEM resin is the ULTEM 1000 grade.

A suitable polyethersulfone thermoplastic has the general empirical formula of $(C_{12}H_{16}SO_3)_n$ where n is an integer of about 50–200. An example of a suitable polyethersulfone which is commercially available is sold as VICTREX PES by ICI, Inc The most preferred of these resins is the VICTREX PES 5200 grade.

For use in the invention, the polymeric material is generally provided in the form of particles, which will preferably be spherical but can be, for example, lenticular or flake-shaped. The particles are preferably fine enough to pass through a No. 60 sieve, U.S. Series (about 250 microns or less), more preferably through a No. 100 sieve (about 150 microns or less) and most preferably through a No. 140 sieve (about 105 microns or less). The absolute size of the polymer particles is less important, however, than their size in relation to the size of the iron-based particles; it is preferred that the polymer particles generally be finer than the iron-based particles. The amount of polymer is generally about 0.001–15% by weight of the total weight of the iron-based particles and polymeric particles. Preferably the polymer is at least about 0.2% by weight, up to about 5% by weight, of this combination. More preferably the polymer is about 0.4–2% by weight, and most preferably about 0.6–1.0% by weight, of the combined weight of the iron-based particles and polymer material.

The iron-based particles and polymeric particles are admixed together, preferably in dry form, by conventional mixing techniques to form a substantially homogeneous particle blend. The dry admixture is then contacted with sufficient solvent to wet the particles, and more particularly to soften and/or partially dissolve the surfaces of the polymeric particles, causing those particles to become tacky and to adhere or bond to the surfaces of the iron-based particles. Preferably the solvent is applied to the dry admixture by spraying fine droplets of the solvent during mixing of the dry blend. Most preferably mixing is continued throughout the solvent application to ensure wetting of the polymer materials and homogeneity of the final mixture. The solvent is thereafter removed by evaporation, optionally with the aid of heating, forced ventilation, or vacuum. Mixing can be continued during the solvent removal step, which will itself aid evaporation of the solvent. The initial dry blending of the particles as well as the application and removal of the solvent can be effected in conventional mixing equipment outfitted with suitable solvent application and recovery means. The conical screw mixers available from the Nauta Company can be used for this purpose.

Any organic solvent for the polymeric material can be used. Preferred are methylene chloride, 1,1,2-trichloroethane, and acetone. Blends of these solvents can also be used. A preferred combination for use in this invention uses a polyetherimide thermoplastic as the polymeric material and methylene chloride as the solvent. The amount of solvent applied to the dry admixture will be about 1–25 weight parts solvent per 100 weight parts of iron-based powder. Generally, however, it is more convenient to calculate the amount of solvent based on the amount of polymeric material present. In these terms, about 1.5–50 weight parts, preferably about 3–20 weight parts, more preferably about 5–10 weight parts of solvent per unit weight part of polymer, will sufficiently wet the admixture.

The iron/polymer powder compositions made by the method of this invention can be formed into magnetic cores by an appropriate molding technique. In preferred embodiments, a compression molding technique, in which the powder composition is charged into a die and heated to a temperature above the glass transition temperature of the thermoplastic material, is used to form the magnetic components. Preferably, the die and composition are heated to a temperature that is about 25–85 Centigrade degrees above the glass transition temperature. Normal powder metallurgy pressures are applied at the indicated temperatures to press out the desired component. Typical compression molding techniques employ compaction pressures of about 5–100 tons per square inch (69–1379 MPa), preferably in the range of about 30–60 tsi (414–828 MPa). A lubricant, usually in an amount up to about 1% by weight, can be mixed into the iron/polymer powder composition, although the lubricant can be applied directly on the die wall. Use of the lubricant reduces stripping and sliding pressures. Examples of suitable lubricants are zinc stearate or one of the synthetic waxes available from Glycol Chemical Co. as ACRAWAX synthetic wax. Another lubricant that can be admixed directly with the iron/polymer powder composition is particulate boron nitride.

Following the compaction step, the molded component is optionally heat treated. According to this procedure, the molded component, preferably after removal from the die and after being permitted to cool to a temperature at least as low as the glass transition temperature of the polymeric material, is separately heated to a "process" temperature that is above the glass transition temperature, preferably to a temperature up to about 140 Centigrade degrees above the temperature at which the component was compacted. The molded component is maintained at the process temperature for a time sufficient for the component to be thoroughly heated and its internal temperature brought substantially to the process temperature. Generally, heating is required for about 0.5–3 hours, depending on the size and initial temperature of the pressed part. The heat treatment can be conducted in air or in an inert atmosphere such as nitrogen.

EXAMPLE 1

An iron/thermoplastic powder composition was prepared using particulate ULTEM 1000 polyetherimide (screened to exclude particles larger than 150 microns) and particles of substantially pure iron that had been annealed in dissociated ammonia and screened to exclude particles smaller than 150 microns and larger than about 375 microns. The iron particles and thermoplastic particles were hand mixed in a dry state in amounts providing an iron/thermoplastic composition that was 0.6% by total weight of the thermoplastic material. Test compositions were prepared by spraying methylene chloride onto the dry admixture, in the amounts specified below, while mixing was continued. Mixing of the wetted admixture was continued for an additional 2–3 minutes after the solvent addition was completed to aid in attaining a homogeneous mixture and to aid in the removal of the solvent by evaporation. At the end of this period, the admixture was spread out on a tray and allowed to dry in air.

Three different test compositions were prepared by the above method, using varying amounts of methylene chloride, as follows: Composition A was made using 1.7 weight parts of solvent per 100 weight parts of iron powder; Composition B was made using 3.3 weight parts solvent per 100 weight parts iron powder; and Composition C made using 8.3 weight parts solvent per 100 weight parts of iron powder. A dry admixture, which had not been treated with the solvent bonding technique according to the present invention, was also retained as a control composition.

Toroids and strength-test bars were prepared from the powder compositions in order to determine magnetic properties and transverse rupture strength. The material was uniformly molded in a die at a temperature of 525° F. (about 274° C.) under a pressure of 40 tsi (about 552 MPa). Following compaction, the pressed pieces were heat-treated at a temperature of 600° F. (about 316° C.) for one hour in air. Transverse rupture strength was determined for the heat-treated test bars according to ASTM B528-76. Results are tabulated in Table 1A. As can be seen, the strength of the parts increased at the higher solvent levels.

TABLE 1A

| | Transverse Rupture Strength (psi) | | | |
| --- | --- | --- | --- | --- |
| | Control | A | B | C |
| Heat-Treated | 26,700 | 21,900 | 28,800 | 34,300 |

AC core loss (watts/pound; measured at 500 Hz, 1 Tesla), was determined for the heat-treated toroids. Results are shown in Table 1B below. The toroid made from the control (no solvent bonding) composition exhibited the highest core loss, indicating that use of the solvent provided improvement over the simple admixture.

TABLE 1B

| | Control | A | B | C |
| --- | --- | --- | --- | --- |
| AC Core Loss | 439 | 82 | 56 | 55 |

EXAMPLE 2

An iron/thermoplastic powder composition was prepared using particulate ULTEM 1000 polyetherimide (screened to exclude particles larger than 104 microns) and ANCORSTEEL 1000C iron powder. The iron particles (297.75 pounds) and thermoplastic particles (2.25 pounds) were mixed in a Nauta conical screw mixer for 15 minutes. Methylene chloride (15 pounds) was then added to the mixture over a period of 15 minutes while the mixing continued. Mixing of the wetted admixture continued for an additional 10 minutes. The solvent was thereafter removed by subjecting the mixing vessel to a vacuum while the mixing continued. The resultant dry powder was then discharged from the mixing vessel.

Strength-test bars and toroids were prepared and tested as described in Example 1. The results were compared to the same control sample used in Example 1. Results are tabulated in Table 2.

TABLE 2

| AC Core Loss and Transverse Rupture Strength | | |
| --- | --- | --- |
| | Control | Test Sample |
| Core Loss 500 Hz, 1 Tesla (Watts/pound) | 439 | 45 |
| Transverse Rupture Strength (psi) | 26,700 | 38,320 |

What is claimed is:

1. A method of making an iron/polymer powder composition of iron-based powder particles to which is bonded a polymeric material, the method comprising:
   (a) forming a dry admixture of iron-based powder particles and particles of a polymeric material, the polymer constituting about 0.001-5.0% by weight of the admixture;
   (b) wetting the dry admixture with a solvent for the polymeric material; and
   (c) removing the solvent.

2. The method of claim 1 wherein material is a thermoplastic polymer and the iron-based powder particles are substantially pure iron.

3. The method of claim 1 wherein the polymeric material is a thermoplastic material having a weight average molecular weight of about 10,000-50,000.

4. The method of claim 2 wherein the thermoplastic material has a glass transition temperature in the range of about 80°-230° C. and constitutes about 0.2-5.0% by weight of the admixture.

5. The method of claim 2 wherein the thermoplastic material is a polyetherimide, a polyphenylene ether, a polyethersulfone, or a polycarbonate.

6. The method of claim 1 wherein said wetting step comprises spraying the solvent onto the admixture while further mixing the admixture, wherein the iron particles have a weight average particle size up to about 500 microns and wherein the particles of polymeric material are finer than about 250 microns.

7. The method of claim 5 wherein said wetting step comprises spraying the solvent onto the admixture while further mixing the admixture, and wherein the solvent is methylene chloride.

8. The method of claim 5 wherein the iron particles have a weight average particle size up to about 500 microns and wherein the particles of polymeric material are finer than about 250 microns.

9. The method of claim 5 wherein the polymer constitutes about 0.4-2% by weight of said dry admixture.

10. The method of claim 8 wherein the polymer constitutes about 0.4-2% by weight of said dry admixture.

11. A method of making an iron/polymer powder composition of iron-based powder particles to which is bonded a polymeric material, the method comprising:
    (a) forming a dry admixture of iron-based powder particles and particles of a polymeric material, the polymer constituting about 0.6-1% by weight of the admixture, wherein the iron-based particles have a weight average size up to about 500 microns, and wherein the particles of polymeric material are finer than about 150 microns;
    (b) wetting the dry admixture with a solvent for the polymeric material; and
    (c) removing the solvent.

12. The method of claim 11 wherein the thermoplastic material comprises a polyetherimide, a polyphenylene ether, a polyethersulfone, or a polycarbonate, wherein the particles of thermoplastic are finer than about 105 microns, and wherein the iron-based particles have a weight average size less than about 250 microns.

13. The method of claim 12 wherein the solvent comprises methylene chloride.

* * * * *

UNITED STATES PATENT AND TRADEMARK OFFICE
CERTIFICATE OF CORRECTION

PATENT NO. :  5,225,459
DATED      :  July 6, 1993
INVENTOR(S):  Christopher Oliver and Shelton Clisby It is certified that error appears in the above-identified patent and that said Letters Patent is hereby corrected as shown below:

Col. 3, line 52, after "4,093,449" insert --issued June--.

Column 8, in claim 2, line 4, after "wherein" insert
     -- the polymeric --.

Signed and Sealed this

Twenty-sixth Day of July, 1994

Attest:

BRUCE LEHMAN

Attesting Officer

Commissioner of Patents and Trademarks